(12) United States Patent
Kumar

(10) Patent No.: US 9,979,674 B1
(45) Date of Patent: May 22, 2018

(54) CAPACITY-BASED SERVER SELECTION

(71) Applicant: Avi Networks, Sunnyvale, CA (US)

(72) Inventor: Raju Kumar, San Jose, CA (US)

(73) Assignee: Avi Networks, Santa Clara, CA (US)

( * ) Notice: Subject to any disclaimer, the term of this patent is extended or adjusted under 35 U.S.C. 154(b) by 193 days.

(21) Appl. No.: 14/788,454

(22) Filed: Jun. 30, 2015

Related U.S. Application Data

(60) Provisional application No. 62/021,966, filed on Jul. 8, 2014.

(51) Int. Cl.
*G06F 15/16* (2006.01)
*H04L 12/911* (2013.01)
*H04L 12/26* (2006.01)
*H04L 29/08* (2006.01)

(52) U.S. Cl.
CPC ........ *H04L 47/823* (2013.01); *H04L 29/0827* (2013.01); *H04L 29/08153* (2013.01); *H04L 29/08171* (2013.01); *H04L 29/08243* (2013.01); *H04L 43/0876* (2013.01); *H04L 43/16* (2013.01); *H04L 67/1004* (2013.01); *H04L 67/1008* (2013.01); *H04L 67/1025* (2013.01)

(58) Field of Classification Search
CPC ............................ H04L 67/10–67/1038; H04L 2012/5678–2012/568; H04L 29/08153–29/08297; G06F 9/50–9/505
See application file for complete search history.

(56) References Cited

U.S. PATENT DOCUMENTS

| | | | | |
|---|---|---|---|---|
| 6,006,264 A | * | 12/1999 | Colby | ................ H04L 12/5695 709/220 |
| 6,542,964 B1 | * | 4/2003 | Scharber | ........... G06F 17/30902 707/E17.12 |
| 7,058,958 B1 | * | 6/2006 | Shutt | ....................... H04L 41/12 707/999.001 |
| 7,512,707 B1 | * | 3/2009 | Manapragada | ..... H04L 67/1008 709/226 |
| 8,539,237 B2 | * | 9/2013 | Monteiro | ............... G06Q 30/02 700/189 |
| 9,389,920 B2 | * | 7/2016 | Zhang | ..................... G06F 9/505 |
| 2003/0158940 A1 | * | 8/2003 | Leigh | ................. H04L 67/1008 709/226 |
| 2004/0111506 A1 | * | 6/2004 | Kundu | .................... H04L 67/42 709/223 |
| 2007/0130341 A1 | * | 6/2007 | Ma | ........................... G06F 1/26 709/226 |
| 2007/0258568 A1 | * | 11/2007 | Green | .................... G06Q 10/06 379/93.25 |
| 2009/0241030 A1 | * | 9/2009 | von Eicken | ............. H04L 67/00 715/735 |
| 2013/0054776 A1 | * | 2/2013 | Kunze | .................. G06F 9/5061 709/224 |
| 2013/0219020 A1 | * | 8/2013 | McCarthy | ......... G06F 17/30902 709/218 |
| 2015/0026108 A1 | * | 1/2015 | Portegys | ............... G06F 9/5083 706/21 |

(Continued)

*Primary Examiner* — Brendan Higa
(74) *Attorney, Agent, or Firm* — Van Pelt, Yi & James LLP

(57) ABSTRACT

A network request is received. A server is selected among a plurality of servers eligible to handle the network request, wherein selecting the server includes selecting a first server in an ordering of the plurality of servers that has not reached its load threshold. The selected server is enabled to handle the network request.

20 Claims, 6 Drawing Sheets

(56) References Cited

U.S. PATENT DOCUMENTS

2015/0334086 A1* 11/2015 Zhao ................... H04L 67/1002
                                                        714/4.11
2016/0378552 A1* 12/2016 Taylor ..................... G06F 9/505
                                                        718/105

* cited by examiner

CAPACITY-BASED SERVER SELECTION

CROSS REFERENCE TO OTHER APPLICATIONS

This application claims priority to U.S. Provisional Patent Application No. 62/021,966 entitled FEWEST SERVERS SERVER SELECTION filed Jul. 8, 2014 which is incorporated herein by reference for all purposes.

BACKGROUND OF THE INVENTION

When selecting a specific server among a group of servers to handle a request and/or a connection, the goal is often to select the server that will provide the best possible service to a client. However, the level of service provided to one client by a server is often quantifiably no worse than that provided to a few more clients. One common algorithm for assigning network connections to servers is minimize the number of connections handled by each server. In this algorithm, the server among a group of eligible servers that is currently handling the least number of network connections is assigned to handle the newest network connection. The least connections algorithm tends to direct client requests to as many servers as possible, in the hope that doing so will provide the best service to the clients by minimizing the number of clients being handled per server. However, the expense of operating a group of servers is often proportional to the number of servers being operated without a significant correlation on the load on each server. Because traditional algorithms such as least connections maximize the number of servers utilized, it is difficult to reduce the number of servers after they are deployed. Additionally by spreading the load to as many servers as possible, benefits of caching at a server are minimized. Therefore, there exists a need for a more effective way to distribute workload among a group of servers.

BRIEF DESCRIPTION OF THE DRAWINGS

Various embodiments of the invention are disclosed in the following detailed description and the accompanying drawings.

DETAILED DESCRIPTION

Figure 1:
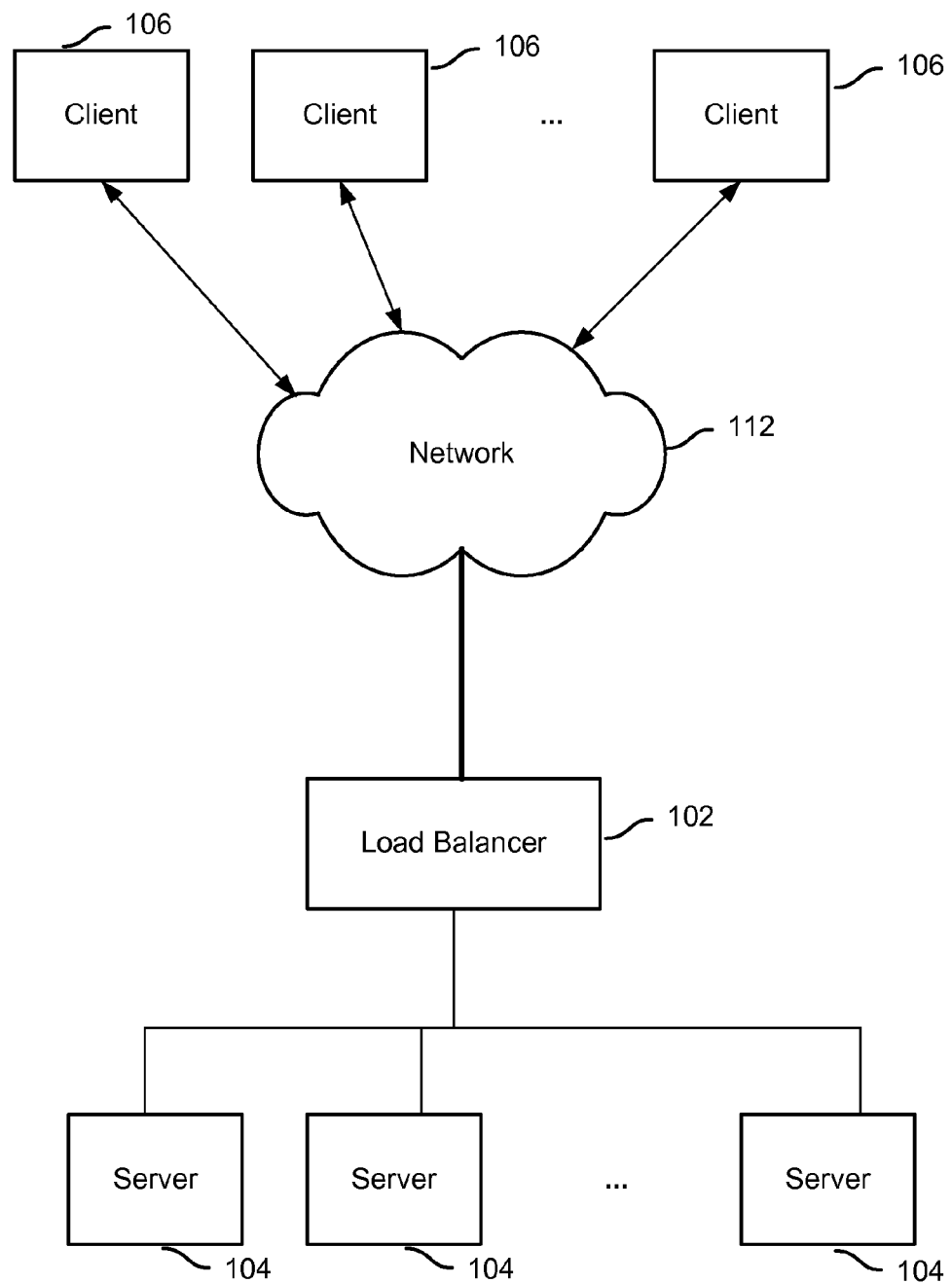
FIG. 1 is a block diagram illustrating an embodiment of a system for allocating network requests.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing network requests is disclosed. In some embodiments, a network request is received. For example, a network connection request to a server for data and/or service is received at a load balancer from a client. It is determined whether there is an available server among a plurality of currently active servers that, when the request is handled by the available server, according to a performance characteristic measurement associated with the available server, would result in a performance measurement that is within an acceptable performance level. For example, each server is filled with requests until the server has reached a predetermined maximum capacity before requests are allocated to another server. By not using any more servers than required, the number of currently active servers may be efficiently managed to minimize the number of servers required to maintain an acceptable level of performance. Additionally, by maximizing use of a single server, caching benefits at the server are maximized. The order in which servers are filled may be a predetermined order. For example, the ordering of servers has been pre-specified. In some embodiments, in the event a server has been idle for at least a threshold amount of time, the server is disabled. In some embodiments, in the event every available server has been overloaded for at least a threshold amount of time, a new server is added to the pool of servers.

FIG. 1 is a block diagram illustrating an embodiment of a system for allocating network requests. Each client of clients 106 may access data/service provided by servers 104. Data/service provided by servers 104 are mirrored across each server 104 and any server of servers 104 may provide the requested data/service of the servers 104. Load balancer 102 assigns network requests for data/services of servers 104 to a selected individual server. For example, when a client of client 106 requests data of server 104, the client contacts load balancer 102 instead of contacting an individual server directly. Based on a load balancing algorithm, load balancer 102 selects the server of server 104 that will be handling the requested service/data. In some embodiments, load balancer 102 serves as a proxy between a client of clients 106 and a server of servers 104. For example, when a client requests to load balancer 102 a connection with a server, the client establishes a first connection with load balancer 102 and load balancer 102 selects the server that will be connected to the client and establishes a second connection with the selected server. Load balancer 102 then effectively links the first connection and the second connection by forwarding/proxying data between the first connection and the second connection.

In some embodiments, load balancer 102 selects a selected server of servers 104 to handle a network request by attempting to utilize the least number of servers as possible while maintaining acceptable performance. Load balancer 102 may determine the maximum load threshold for each server of servers 104 based on observed performance of the servers. For example, when load balancer 102 proxies communication between servers 104 and clients 106, load balancer 102 may measure performance characteristics such as average latency as a function of server load (e.g., number of concurrent connections being handled by the server) for each server to periodically determine the threshold server load that meets an acceptable performance for each server. In some embodiments, servers are ordered in an assignment order and when assigning a connection to a specific server, the servers are traversed in the assignment order to assign the connection to the first server in the order that has not reached its load threshold. This allows a server to be filled to its threshold capacity before a next server in the order is assigned to handle the network connection. As servers are no longer needed (e.g., a server is constantly sitting idle), servers may be disabled (e.g., powered down) to save costs and as new servers are needed (e.g., all server load thresholds reached), new servers may be dynamically added/enabled.

Examples of a client of clients 106 include a laptop computer, a desktop computer, a smartphone, a tablet computer, an Internet of Things device, a wearable computer, a wireless repeater, a wireless router, or any other wireless computer or device. Load balancer 102 may include one or more devices and/or servers. Each server of servers 104 may include a plurality of devices and/or servers. Examples of network 112 include one or more of the following: a direct or indirect physical communication connection, a mobile communication network, a wireless network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. The connections between the components shown in FIG. 1 may be a wired connection, a wireless connection, and/or software data communication paths. Although limited instances of components are shown in FIG. 1 to simplify the diagram, additional instances of any of the components shown in FIG. 1 may exist. Components not shown in FIG. 1 may also exist. For example, networking components such as switches, routers, gateways, etc. have not been shown to simplify and illustrate the embodiment more clearly.

Figure 2:
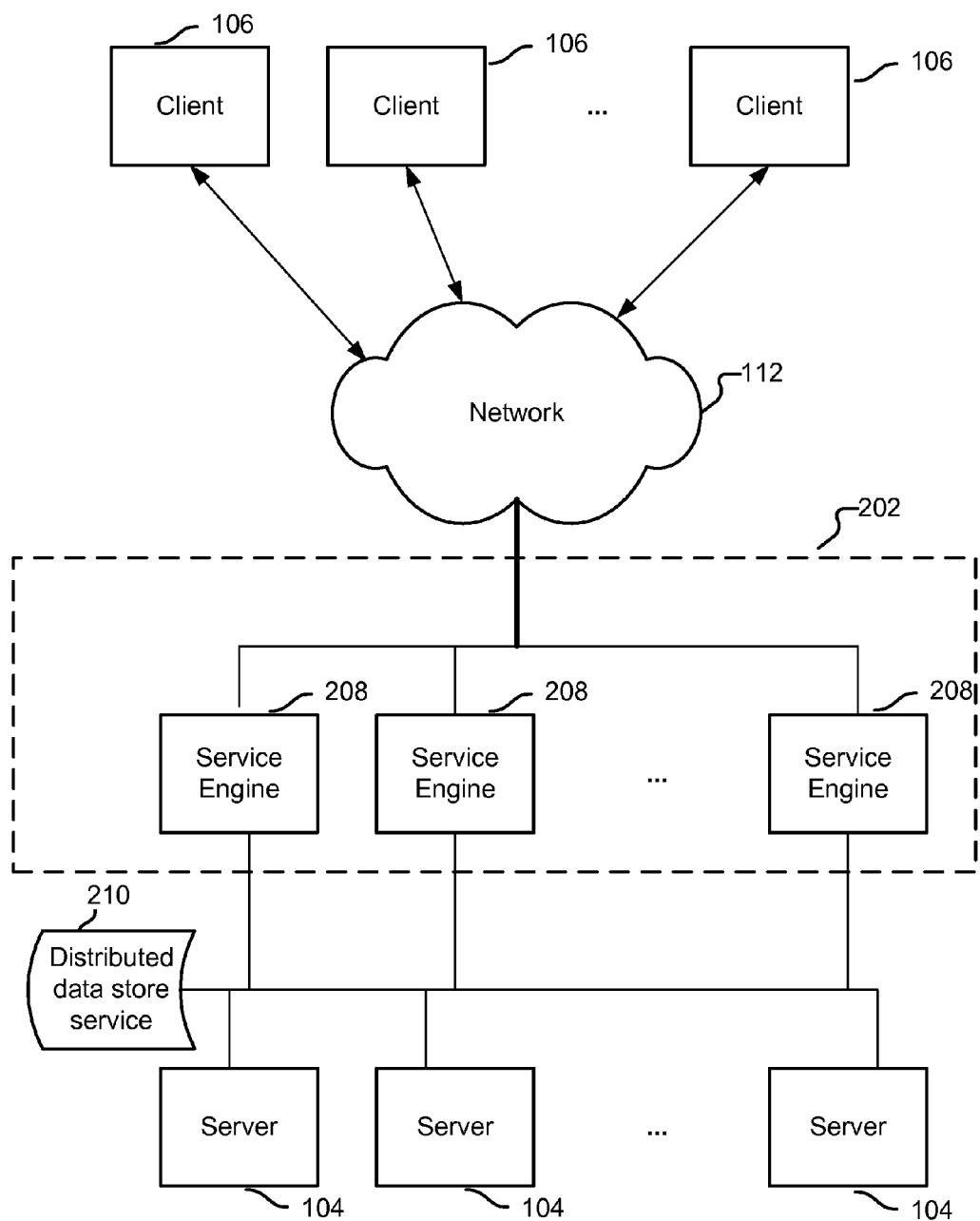
FIG. 2 is a block diagram illustrating an embodiment of a distributed load balancer.

FIG. 2 is a block diagram illustrating an embodiment of a distributed load balancer. In some embodiments, a distributed load balancer is utilized to distribute load to the least number of servers as possible while maintaining an acceptable level of performance. In some embodiments, the distributed load balancer includes a plurality of service engines configured to provide load balancing functions. A service engine is configured to execute on one or more computer processors, communicate with a plurality of clients, and distribute connections from the clients among a plurality of servers. Load balancing state information such as connection and/or server related information is synchronized across the plurality of service engines using a distributed data store service that supports an atomic read-miss-create (RMC) function.

Load balancer 202 may be within a data center network or other service provider network. A number of servers 104 are configured to provide network-based applications and services to the clients. In some embodiments, each server is implemented on a separate physical device. In some embodiments, multiple servers share the same physical device. In the example shown, separate physical devices communicate via communications interfaces such as buses, cables, optical or wireless interfaces, etc. In some embodiments, the servers operate within standard operating systems (e.g., Linux™, Windows™, etc.) on physical devices; in some embodiments, the servers operate within operating systems on virtual machines (VMs) (e.g., virtual machines supported by a hypervisor). Clients 106 establish connections with servers 104 to gain access to the applications and services.

In the example shown, the load balancer includes a plurality of service engines 208. Each service engine may be implemented on a physical device or a virtual machine; multiple service engines may execute on separate physical devices or share the same physical device. Each service engine implements distributed load balancing functions, which can be implemented in software code, in hardware (e.g., using application specific integrated circuits (ASIC)), or a combination. The initial connection request from a client 106 can be received by any service engine 208. To distribute resources, each service engine 208 performs load balancing functions to direct the connection to a selected one of the servers based on a load balancing algorithm. A variety of load balancing algorithms may be implemented using known techniques. As will be described in greater detail below, service engines 208 cooperate to function as a single load balancer to distribute connections received on network 112 to servers 104. In some embodiments, much like load balancer 102, one or more service engines of service engines 208 select a selected server of servers 104 by attempting to utilize the least number of servers as possible while maintaining an acceptable level of performance.

Service engines 208 need certain information, referred to as load balancing state information, to provide load balancing functions. Such load balancing state information should be globally visible to all the service engines and constantly updated. In some cases, the load balancing state information can be used as inputs to certain load balancing algorithms. A few examples of load balancing state information include:

1) Health information of the servers. In some embodiments, a monitoring process periodically checks with the servers to determine whether any of them has failed. The obtained health information is used by the service engines to include healthy servers and exclude failed servers for load balancing purposes. Other examples of obtained information may include CPU utilization, memory utilization, storage utilization, etc.

2) Session information, such as secure socket layer (SSL) or transport layer security (TLS) session information. A set of related data exchanges between a client and one or more server applications is referred to as a session. For example, when a user uses a browser application on a client device to access a secure e-commerce application on a server to purchase a product, the set of secure transaction-related data exchanges is conducted within a SSL or TLS session. While multiple servers can provide the same service to a client, a session is preferably conducted between one client and one server. An SSL/TLS session is first established after a set of handshakes between the client and the server. Session information such as IP address and encryption parameters (e.g., session key, master key, etc.) is generated. Establishing the secure session is computationally expensive since the process requires multiple steps of encryption and decryption; thus, for efficiency reasons, the same secure session is sometimes maintained to handle multiple connections from the same client. In other words, if a client first establishes an SSL/TLS session with a website with a first connection request, and shortly thereafter returns to the website with a second connection request, the same secure session is maintained for the first and the second connections. In some embodiments, an SSL/TLS table that maps a session ID and session parameters is used to maintain SSL/TLS session information.

3) Persistence information. Once a session is established, subsequent data packets sent by the client on the same session should be directed to the same server in a persistent manner. As used herein, a session can be a secure session such as an SSL/TLS session, as well as an application session specified by the server application (e.g., a log on session with specific exchanges). In some stateful persistence schemes such as source Internet Protocol (IP) address-based persistence, a mapping table or the like is used to track persistence information such as the mapping relationships between source IP addresses and corresponding load balanced servers used to service the session. In other schemes such as application-based persistence, the persistence information further includes a mapping table of application/session identifiers (or other session identifying information) and corresponding load balanced servers. For purposes of illustration, examples involving the source IP address-based scheme are discussed in more detail below; however, other schemes/mapping tables can also be used.

4) Client/server connection information such as the number of connections from a given client, the number of connections being handled by a server, etc.

5) Connection limitation information such as the maximum number of connections a server, a client, or the load balancer as a whole is permitted or capable of handling, etc.

6) Load balancing measurements such as how much load each server has based on number of connections, response time, latency, delay, bandwidth, other connection performance information, etc. Many other types of load balancing states are possible.

Many other types of load balancing state information can be used. Depending on implementation, different types of load balancing state information can be stored in different data stores/data structures or a unified data store/data structure.

In the example shown, a distributed data store service 210 is used to synchronize load balancing state information across service engines 208 and facilitate cooperation among the service engines. Specifically, distributed data store service 210 supports an atomic read-miss-create (RMC) function. As will be described in greater detail, in various embodiments, distributed data store service 210 is implemented using one or more databases, a distributed protocol, and/or other appropriate techniques. In some embodiments, distributed data store service 210 supplies a set of application programming interfaces (APIs) so that the same services (functions) are provided to the service engines regardless of the underlying mechanisms used to implement the service.

Figure 3:
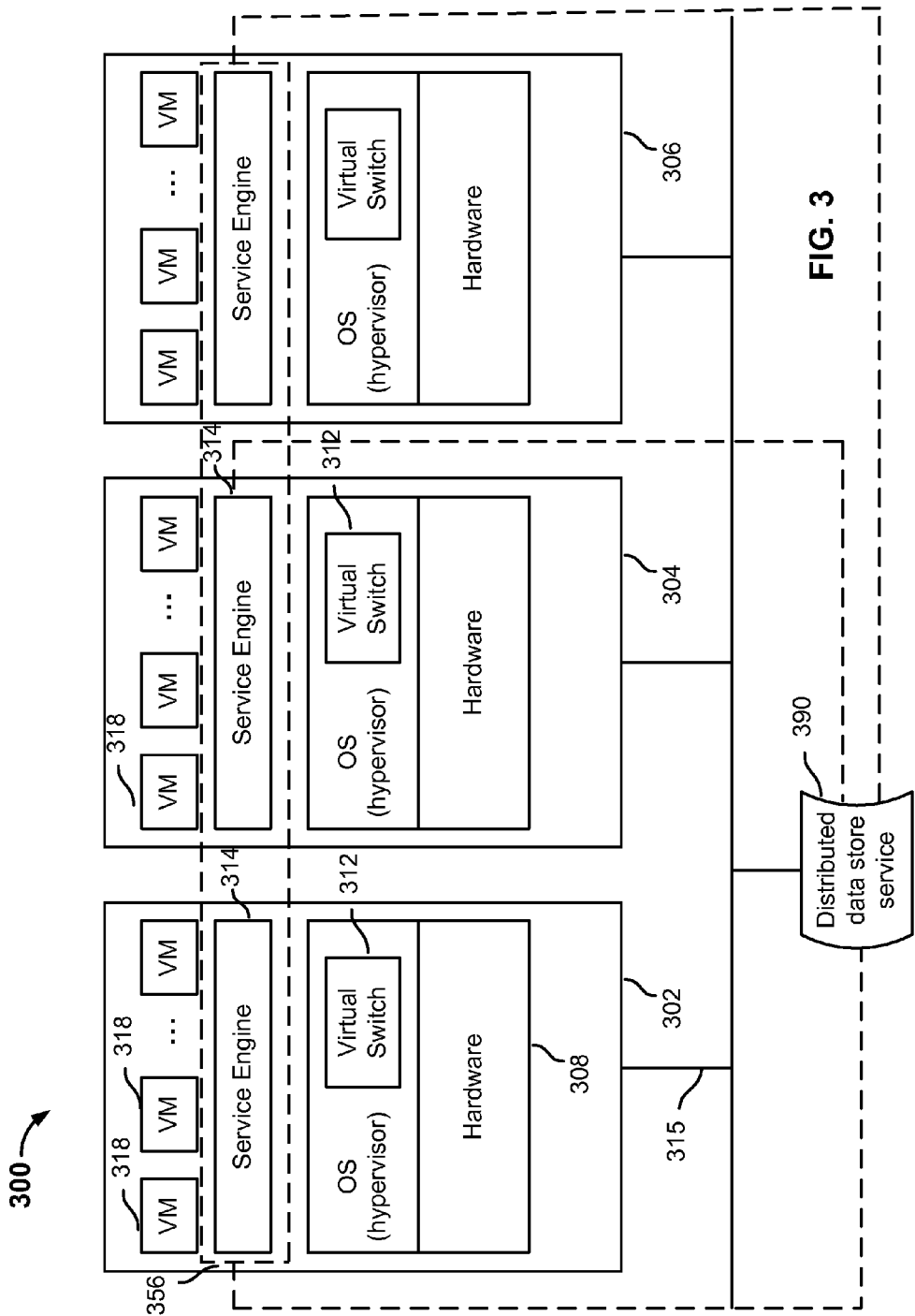
FIG. 3 is a block diagram illustrating an embodiment of a virtualized distributed load balancer.

FIG. 3 is a block diagram illustrating an embodiment of a virtualized distributed load balancer. In this example, platform 300 includes a number of devices (e.g., multiple server computers or a multicore server comprising multiple processing cores). A physical device (e.g., 302, 304, 306, etc.) has hardware components and software components. In particular, hardware of the device supports operating system software in which a number of virtual machines (VMs) 318 are configured to execute. A VM is a software implementation of a machine (e.g., a computer) that simulates the way a physical machine executes programs. The part of the device's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM was running on its own dedicated hardware. Examples of hypervisors include VMware Workstation® and Oracle VM VirtualBox®.

In this example, clients (not shown) communicate with servers, which are configured as VMs executing instances of network applications. Examples of such network applications include web applications such as a web application, shopping cart, user authentication, credit card authentication, email, file sharing, virtual desktops, voice/video streaming, online collaboration, etc. Many other network applications can be implemented. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. A network service layer providing load balancing functions is described in detail below. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch 312. A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines 314 are instantiated on a physical device. In some embodiments, service engines 314 are the service engines 208 of FIG. 2. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. In some embodiments, a load balancer component is executed within a service engine to provide load balancing logic, specifically to distribute traffic load amongst instances of target applications executing on the local physical device as well as other physical devices. In some embodiments, other types of service components such as firewalls may be implemented and enabled as appropriate. When a specific service is desired, a corresponding service component is configured and invoked by the service engine to execute in a VM. A distributed load balancer comprising multiple load balancer components is described in detail below.

A virtual switch such as 312 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). In some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application execute. In some embodiments, a service engine sends data to and receives data from a target application via the virtual switch.

In some embodiments, a controller (not shown) is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof.

In the example shown, a distributed data store service 390 is used to store data and facilitate the synchronization of load balancing state information across service engines. The service engines and the distributed data store service cooperate to function as a single entity, forming a distributed network service layer 356 to provide services to the target applications. In other words, although multiple service engines 314 are installed and running on multiple physical devices, they cooperate to act as a single layer 356 across these physical devices. In some embodiments, the service engines cooperate by sharing state information (e.g., load balancing state information) using distributed data store service 390.

In some embodiments, a single service layer is presented to the target applications to provide the target applications with services. The interaction between the target applications and the service layer is transparent in some cases. In this example, a load balancing service is provided by the service layer, and the target application sends and receives data via existing APIs as it would with a standard, non-distributed load balancing device. In other words, from the perspective of a client or a server-side application targeted by the client, it is as if a single service layer object (specifically, a single load balancer) were instantiated and with which the client or target application communicated, even though in some implementations multiple service engine objects (with multiple load balancing components) execute on multiple devices.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine (in particular the load balancing component within the service engine) performs load balancing functions. Specifically, based on load balancing factors such as configured rules and operating conditions, the service engine redirects the traffic to an appropriate target application executing in a VM on a server.

Figure 4:
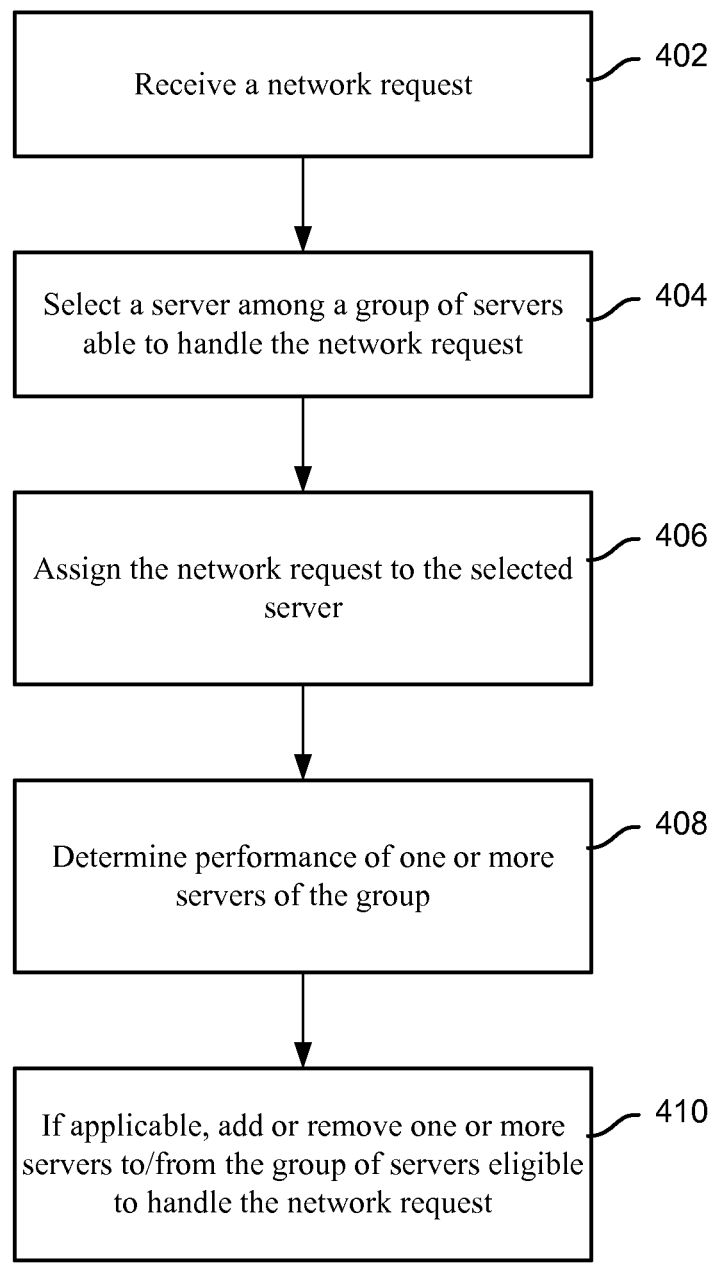
FIG. 4 is a flowchart illustrating an embodiment of a process for handling a request.

FIG. 4 is a flowchart illustrating an embodiment of a process for handling a request. The process of FIG. 4 may be implemented on load balancer 102 of FIG. 1, load balancer 202 of FIG. 2, a service engine of service engines 208 of FIG. 2, and/or a service engine of service engines 314 of FIG. 3. In some embodiments, the process of FIG. 4 is repeated to handle each received network request.

At 402, a network request is received. In some embodiments, the network request is a request for a network connection. In some embodiments, the network request is a request to obtain data and/or service. For example, a request for a connection to obtain a webpage is received. In some embodiments, the network request is received from a client device at a network load balancer.

At 404, a server is selected among a group of servers able to handle the network request. In some embodiments, selecting the server includes selecting a server among a plurality of servers eligible to handle the network request. For example, a plurality of servers is included in a network cloud to handle client requests and a determination is made as to which specific server will handle the specific network request. In some embodiments, the total number of servers that have been assigned network requests is attempted to be minimized while still maintaining an acceptable level of performance. In some embodiments, servers are ordered according to assignment order and when assigning a connection to a specific server, the servers are traversed in the assignment order to assign the connection to the first server in the order that has not reached its load threshold.

Often a multi-core server can serve one client or 10-20 concurrent clients with approximately the same performance characteristics. By not using any more servers than required to maintain an acceptable level of performance, cost savings from operating fewer servers and performance gains from increased cache utilization may be realized. In some embodiments, performance of a server is characterized by the latency of providing a response to a request (e.g., time between being provided a request and receiving a first byte of the request). Initially as more clients are directed to a server, the latency observed by the clients often does not increase perceptibly. However as an order of magnitude of more clients is directed to a server, the latency increases more significantly. In some embodiments, selecting the server includes monitoring load vs. latency of servers. For example, because a load balancer is able to observe network traffic as data is proxied between clients and servers via the load balancer, the load balancer is able to measure latency of each server as a function of load (e.g., number of concurrent network requests/connections being handled) of the server.

The load level at which latency degrades quantifiably to a point that is on the limit of an acceptable performance is identified as the threshold load for each server. In some embodiments, a server with a non-zero load that is less than the threshold load is preferably selected to handle a new network request. For example, if ten servers are made available and ten clients simultaneously make one request each, prior least connections allocation methods will direct one client to each server. Rather, in some embodiments, one of these servers is provided all ten client requests in the event the server's load threshold is ten connections or greater. In doing so, nine of the servers are not utilized and may be powered down if the overall demand load does not increase significantly. Because the client load often changes based on the time of the day, additional servers may be activated as overall load ramps up and some servers may be switched off as the overall demand decreases.

At 406, the network request is assigned to the selected server. In some embodiments, assigning the network request includes allowing the select server to handle (e.g., provide request data/service) the network request. In some embodiments, assigning the request includes establishing a connection with the selected server and providing the network request to the server via the established connection. For example, a load balancer/service engine connects to the selected server and proxies communication between the client that provided the network request and the selected server.

At 408, performance of one or more servers of the group are determined. In some embodiments, determining the performance includes measuring a performance measure of a network connection with the selected server. For example, latency, delay, bandwidth, time to completion, error rate, etc. are measured in handling of the network request by the selected server. In some embodiments, one or more performance measurements are received from the selected server. For example, measurements of processor utilization, load, number of network connections, memory utilization, storage utilization, and/or other system measurements of the server may be provided by the server. The determined performance data may be stored for analysis.

In some embodiments, using one or more measurements of performance, load thresholds of each of one or more servers are determined. For example, the ideal maximum of number of concurrent connections/requests that should be handled by a server is determined periodically and updated based on past performance measurements of the server. In some embodiments, in the event the latest determined performance is worse than a performance limit, the load threshold of the server is dynamically determined again and/or adjusted. For example, although typically a load threshold limit is periodically determined using past performance data, in the event a latest performance measurement is beyond a performance limit, the load threshold is dynamically reduced outside of the periodic update cycle to be less than the current load of the server. In some embodiments, the load thresholds individually determined for each server of the group of available servers are cross normalized across all of the load thresholds of the servers. For example, because the performance characteristics of each server of the group can widely vary, the threshold load is normalized to maintain similar performance characteristics of the servers at the load thresholds.

At 410, one or more servers are added to or removed from the group of servers eligible to handle the network request, if applicable. In some embodiments, one or more servers to disable are identified. For example, in the event one or more servers have been idle for at least a threshold amount of time, these server(s) are disabled. Determining that a server has been idle may include determining that an average and/or total number of network requests handled by the server within the latest period of amount of time is less than idle threshold number. In some embodiments, disabling a server includes powering/shutting down a server. In some embodiments, disabling a server includes requesting a reduction in cloud computing resources. In some embodiments, disabling a server includes reducing a power consumption of the server (e.g., reduce CPU power level, sleep state, hibernate state, shutdown components (e.g., hard drive, memory, etc.) of the server, etc.). In some embodiments, prior to disabling a server, an indication is provided to a user/administrator. The user/administrator may need to confirm the indication before the server is disabled.

In some embodiments, one or more additional servers are enabled and added to the group of servers. For example, in the event one or more (e.g., every) server of the group of servers has reached its load threshold for at least a threshold amount of time, one or more servers are enabled/added to increase capacity of the group of servers. In some embodiments, in the event at least one server of the group of servers has been overloaded (e.g., handing load greater than load threshold) for at least a threshold amount of time and/or at least a threshold number of network requests has resulted in overloading a server (e.g., within a specified number of latest network requests and/or within past specified amount of time), an indication is provided to enable a new server, if available. Determining that every server of the group has been overloaded may include determining that an average and/or total number of network requests handled by each server within the latest period of amount of time is greater than an overload threshold number. In some embodiments, enabling a server includes powering/turning on a server. In some embodiments, enabling a server includes modifying a power state of the server. In some embodiments, enabling a server includes requesting additional cloud computing resources. In some embodiments, prior to enabling a server, an indication is provided to a user/administrator. The user/administrator may need to confirm the indication before the server is enabled.

Figure 5:
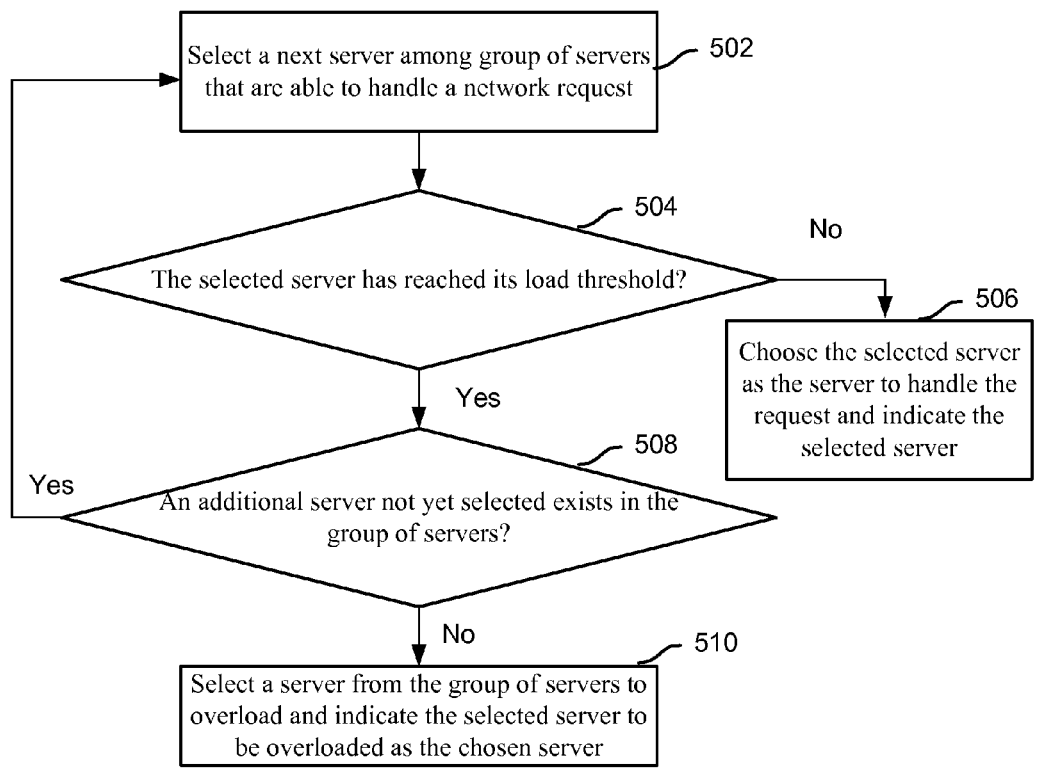
FIG. 5 is a flowchart illustrating an embodiment of a process for selecting a server to handle a request.

FIG. 5 is a flowchart illustrating an embodiment of a process for selecting a server to handle a request. The process of FIG. 5 may be implemented on load balancer 102 of FIG. 1, load balancer 202 of FIG. 2, a service engine of service engines 208 of FIG. 2, and/or a service engine of service engines 314 of FIG. 3. In some embodiments, the process of FIG. 5 is included in 404 of FIG. 4.

At 502, a next server is selected among a group of servers that are able to handle a network request. For example, the network request has been received in 402 of FIG. 4 and the network request is to be assigned to be handled by one of a plurality of servers eligible to handle the request. In some embodiments, selecting the next server includes selecting the next server from a group of servers in a predictable selection ordering. For example, by being able to predictably determine a selection order of servers, the servers are load filled in order to minimize the number of servers utilized to handle requests. The first server selected in 502 (e.g., each time the process of FIG. 5 is repeated for a different network request) is the first server in an ordering of the group of servers. In some embodiments, the order in which servers are selected is predetermined. For example, the ordering of servers may be preassigned by a user/administrator. In some embodiments, the selection ordering is predetermined based on one or more performance factors. In some embodiments, the servers are ordered in order of determined load thresholds corresponding to the servers (e.g., ordered from best/greatest load threshold to worst/smallest load threshold). In some embodiments, the selection ordering has been predetermined in a random order. For example, once a random order has been determined, the random order is saved and utilized to order the servers. In some embodiments, the selection ordering is based at least in part on the order a server was added to a pool of servers available to handle a network request. For example, the servers of the group are ordered from oldest to newest added or from newest to oldest added.

At 504, it is determined whether the selected server has reached its load threshold. In some embodiments, determining whether the selected server has reached its load threshold includes determining whether the total number of connections/requests being handled by the server has reached its load threshold limit. In some embodiments, the load threshold is predetermined in 408 of FIG. 4 and/or using the process of FIG. 6. In some embodiments, determining whether the selected server has reached its load threshold includes determining whether a performance characteristic of the server has reached a limit. For example, it is dynamically determined whether one or more of the latest performance characteristics (e.g., latency, delay, bandwidth, time to completion, error rate, processor utilization, load, number of network connections, memory utilization, storage utilization, etc.) determined for the server have reached a corresponding limit.

If at 504 it is determined that the selected server has not reached its load threshold, at 506 the selected server is chosen as the server to handle the request and the selected server is indicated. The indication may be received in 404 of FIG. 4 and the chosen server is assigned to handle the network request in 406 of FIG. 4.

If at 504 it is determined that the selected server has reached its load threshold, at 508 it is determined whether an additional server not yet selected exists in the group of servers. For example, it is determined whether an additional server not yet selected in 502 exists in the group of servers available to handle the network request. There may be no additional servers left if the last server in the ordering of the group of servers has been reached.

If at 508 it is determined that an additional server not yet selected exists in the group of servers, the process returns to 502.

If at 508 it is determined that no additional servers not yet selected exist in the group of servers, at 510 a server to overload is selected from the group of servers and indicated as the chosen server. For example, because all servers have reached their respective load limits, a server to be overloaded to handle the network request is selected. In some embodiments, selecting the server to overload includes selecting the server that is currently handling the least number of connections/requests. In some embodiments, selecting the server to overload includes selecting the server at random. In some embodiments, selecting the server to overload includes selecting the server that is associated with the best performance metric (e.g., latency, delay, bandwidth, time to completion, error rate, processor utilization, load, number of network connections, memory utilization, storage utilization, etc.) as compared to the other servers of the group of servers. In some embodiments, the indication of the chosen server to overload is received in 404 of FIG. 4 and the chosen server is assigned to handle the network request in 406 of FIG. 4.

In some embodiments, an indication is provided to enable a new server in the event a criteria has been reached. For example, in the event at least one server of the group has been overloaded for at least a threshold amount of time and/or at least a threshold number of network requests have resulted in overloading a server (e.g., within a specified number of latest network requests and/or within a past specified amount of time), an indication is provided to enable a new server, if available. In an alternative embodiment, rather than overloading a server, a new server is added to the group of eligible servers to handle the network request. For example, a server that had been disabled (e.g., powered down) is enabled again to handle network requests.

Figure 6:
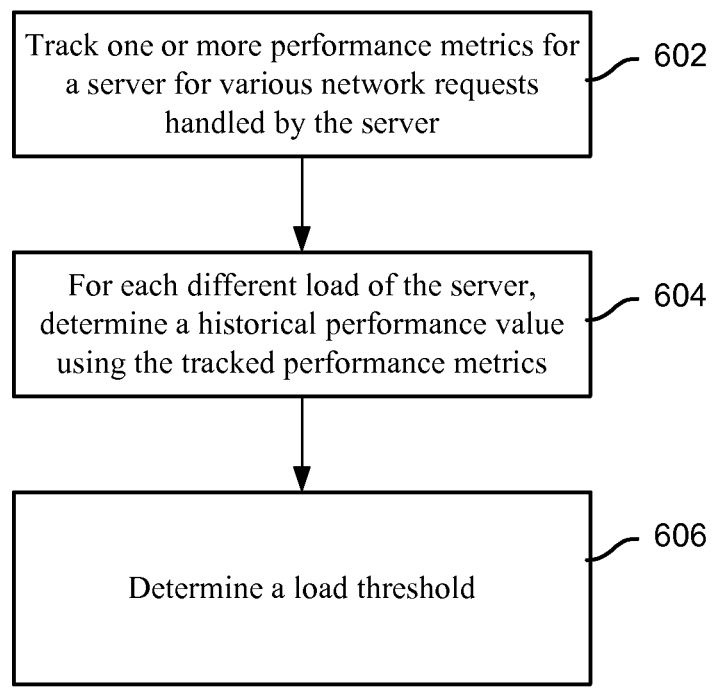
FIG. 6 is a flowchart illustrating an embodiment of a process for determining a load threshold.

FIG. 6 is a flowchart illustrating an embodiment of a process for determining a load threshold. The process of FIG. 6 may be implemented on load balancer 102 of FIG. 1, load balancer 202 of FIG. 2, a service engine of service engines 208 of FIG. 2, and/or a service engine of service engines 314 of FIG. 3. In some embodiments, the process of FIG. 6 is included in 408 of FIG. 4. In some embodiments, the process of FIG. 6 is repeated periodically and/or dynamically for each server of a group of servers.

At 602, one or more performance metrics are tracked for a server for various network requests handled by the server. For example, the requests handled using the process of FIG. 4 are tracked. In some embodiments, tracking the performance metrics includes tracking one or more performance metrics as a function of a load of the server. For example, for a specific number of connections/requests concurrently being handled by the server, the one or more performance metrics are determined and saved for analysis. Examples of the performance metrics include network latency, delay, bandwidth, time to completion, error rate, and/or other network metrics that are able to be measured by an external proxy (e.g., load balancer, service engine, etc.) of the server. Examples of the performance metrics also include performance data (e.g., processor utilization, load, number of network connections, memory utilization, storage utilization, etc.) measured and reported by the server.

At 604, for each different load of the server, a historical performance value is determined using the tracked performance metrics. For example, for each load in a prespecified load range or load range observed by the server, a performance value that summarizes the performance of the server at the specific load is determined. In some embodiments, only the performance metrics obtained since the previous analysis in 604 are analyzed to determine the historical performance values. For example, only the performance metrics determined within the last specified amount of time are utilized in determining the historical performance values. In some embodiments, determining the historical performance values includes determining a historical latency as a function of the number of concurrent network connections/requests handled by the server. For example, latencies of the server measured in 602 are sorted into groups corresponding to the server load level at the time of latency measurement and the latencies of each group are averaged to determine the historical performance value at each load level. The historical performance value may be a statistical value (e.g., average, mode, median, percentile (e.g., 90 percentile), maximum, minimum, etc.) of one or more determined performance metrics for the specific corresponding load.

At 606, a load threshold is determined. For example, the load threshold is the maximum of concurrent network connections/requests to be handled by the server before the server is overloaded. In some embodiments, determining the load threshold includes selecting the load level that corresponds to the limit (e.g., worst) of corresponding historical performance values that meets an acceptable performance limit. For example, the maximum number of connections that corresponds to the worst average latency value still within an acceptable maximum latency limit is selected as the load threshold. In some embodiments, the acceptable performance limit is specified by a user/administrator. In some embodiments, the acceptable performance limit is dynamically determined. For example, a baseline performance value (e.g., average performance value, performance value for one connection load, etc.) is determined and a value above a certain percentage/amount above the baseline performance value (e.g., double baseline performance) is set as the acceptable performance limit. In some embodiments, the load threshold is adjusted by cross-normalizing the historical performance values corresponding to the load threshold of each server of the group of servers. In some embodiments, the acceptable performance limit is common across all servers of the group of servers (e.g., utilized to determine the load threshold for all servers of the group) and is determined at least in part by cross normalizing corresponding historical performance values. In another embodiment the acceptable performance limit is specific to each server of the group of servers.

In some embodiments, determining the load threshold includes identifying the load at which the corresponding historical performance value increases by a value greater than a difference limit and the load threshold is set as the load immediately prior to the identified load. In some embodiments, determining the load threshold includes identifying the load at which the rate of change (e.g., slope) of the corresponding historical performance value is greater than a rate of change limit and the load threshold is set as the load immediately prior to the identified load.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a communication interface configured to receive a network request; and
    a processor coupled with the communication interface and configured to:
        identify a plurality of servers eligible to handle the network request and a determined traversal order of the plurality of servers eligible to handle the network request;
        traverse the plurality of eligible servers in the determined traversal order to identify that a selected server of the plurality of servers eligible to handle the network request has a non-zero load as opposed to another server of the plurality of servers that has a zero load;
        at least in part in response to the identification that the selected one of the plurality of servers has the non-zero load as opposed to the another server of the plurality of servers that has the zero load, determine to assign the network request to the selected server with the non-zero higher load, wherein the selected server has a load threshold that is dynamically exceedable based at least in part on whether a next server in the determined traversal order of the plurality of servers has not yet been selected due its zero load; and
        enable the selected server to handle the network request.

2. The system of claim 1, wherein the traversal order in which the plurality of servers is to be filled is predetermined.

3. The system of claim 1, wherein the traversal order in which the plurality of servers is to be filled is at least in part specified by a user.

4. The system of claim 1, wherein the traversal order of the plurality servers was determined based at least in part on an ordering of a performance characteristic of each server of the plurality of servers.

5. The system of claim 1, wherein the system tracks a total number of network connection requests being handled for each server of the plurality of servers.

6. The system of claim 1, wherein the selected server has not reached its load threshold in the event a total number of concurrent network connections being handled by the selected server is less than the load threshold.

7. The system of claim 1, wherein each server of the plurality of servers is associated with a corresponding load threshold that may be different from each other.

8. The system of claim 1, wherein the load threshold was determined for the selected server at least in part by determining a performance characteristic of the selected server at a plurality of load levels of the selected server and by determining a historical performance value for each of the plurality of load levels.

9. The system of claim 8, wherein the load threshold was determined for the selected server at least in part by selecting a load level that corresponds to a worst historical performance value that still meets an acceptable performance value limit.

10. The system of claim 8, wherein determining the historical performance value for at least one of the plurality of load levels includes averaging performance values associated with the at least one of the plurality of load levels.

11. The system of claim 1, wherein the load threshold was determined for the selected server at least in part by measuring at the system a latency of the selected server when processing a previous network request.

12. The system of claim 1, wherein the load threshold was determined for the selected server at least in part by cross normalizing the load threshold across different initial load thresholds of the plurality of servers.

13. The system of claim 1, wherein the load threshold for the selected server is periodically determined using recent performance characteristics of the selected server.

14. The system of claim 1, wherein the system is a network load balancer.

15. The system of claim 1, wherein enabling the selected server to handle the network request includes establishing a connection with the selected server and providing the network request to the server.

16. The system of claim 1, wherein enabling the selected server to handle the network request includes proxying communication between a client that provided the network request and the selected server.

17. The system of claim 1, wherein in the event one server of the plurality of servers has been not handling requests for at least a threshold amount of time, the one server is removed from the plurality of servers.

18. The system of claim 1, wherein in the event every server of the plurality of servers has reached its respective load threshold for at least a threshold amount of time, a new server is added to the plurality of servers.

19. A method, comprising:
    receiving a network request;
    identifying a plurality of servers eligible to handle the network request and a determined traversal order of the plurality of servers eligible to handle the network request;
    using a processor to traverse the plurality of eligible servers in the determined traversal order to identify that a selected server of the plurality of servers eligible to handle the network request has a non-zero load as opposed to another server of the plurality of servers that has a zero load;

at least in part in response to the identification that the selected one of the plurality of servers has the non-zero load as opposed to the another server of the plurality of servers that has the zero load, determining to assign the network request to the selected server with the non-zero higher load, wherein the selected server has a load threshold that is dynamically exceedable based at least in part on whether a next server in the determined traversal order of the plurality of servers has not yet been selected due its zero load; and enabling the selected server to handle the network request.

20. A computer program product, the computer program product being embodied in a non-transitory computer readable storage medium and comprising computer instructions for:

receiving a network request;

identifying a plurality of servers eligible to handle the network request and a determined traversal order of the plurality of servers eligible to handle the network request;

traversing the plurality of eligible servers in the determined traversal order to identify that a selected server of the plurality of servers eligible to handle the network request has a non-zero load as opposed to another server of the plurality of servers that has a zero load;

at least in part in response to the identification that the selected one of the plurality of servers has the non-zero load as opposed to the another server of the plurality of servers that has the zero load, determining to assign the network request to the selected server with the non-zero higher load, wherein the selected server has a load threshold that is dynamically exceedable based at least in part on whether a next server in the determined traversal order of the plurality of servers has not yet been selected due its zero load; and enabling the selected server to handle the network request.

* * * * *